United States Patent
Drenguis

(10) Patent No.: US 8,678,168 B2
(45) Date of Patent: Mar. 25, 2014

(54) STORE, IN PARTICULAR BUFFER STORE FOR STORING BOTTLES OR SIMILAR CONTAINERS

(75) Inventor: Alfred Drenguis, Börnsen (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 13/642,900

(22) PCT Filed: Apr. 6, 2011

(86) PCT No.: PCT/EP2011/001695
§ 371 (c)(1),
(2), (4) Date: Oct. 23, 2012

(87) PCT Pub. No.: WO2011/157313
PCT Pub. Date: Dec. 22, 2011

(65) Prior Publication Data
US 2013/0037377 A1    Feb. 14, 2013

(30) Foreign Application Priority Data
Jun. 15, 2010  (DE) .......................... 10 2010 023 757

(51) Int. Cl.
*B65G 1/00*         (2006.01)
(52) U.S. Cl.
USPC .................................. 198/347.1; 414/331.05
(58) Field of Classification Search
USPC .......... 198/347.1, 347.3; 414/331.02, 331.05, 414/331.09, 331.06
See application file for complete search history.

(56) References Cited

U.S. PATENT DOCUMENTS

| | | | |
|---|---|---|---|
| 3,499,555 A * | 3/1970 | Wahle | 198/347.3 |
| 3,783,994 A | 1/1974 | Tomalty | |
| 5,304,027 A | 4/1994 | La Barre et al. | |
| 5,400,894 A * | 3/1995 | Smith | 198/347.2 |
| 5,568,850 A * | 10/1996 | Neber | 198/347.1 |
| 6,206,169 B1 * | 3/2001 | Spatafora | 198/347.1 |
| 6,725,997 B2 * | 4/2004 | Draghetti | 198/347.1 |
| 6,817,464 B2 * | 11/2004 | Biondi et al. | 198/347.1 |

FOREIGN PATENT DOCUMENTS

| | | |
|---|---|---|
| DE | 20 2005 013552 | 11/2005 |
| DE | 10 2008 013951 | 9/2009 |
| EP | 0 486 360 | 5/1992 |
| EP | 0 616 959 | 9/1994 |
| EP | 0 842 877 | 5/1998 |
| FR | 2 789 374 | 8/2000 |
| WO | WO 90/01095 | 2/1990 |

\* cited by examiner

*Primary Examiner* — James R Bidwell
(74) *Attorney, Agent, or Firm* — Occhiuti & Rohlicek LLP

(57) ABSTRACT

A buffer store for storing containers having a container axis has rotor that can be driven to rotate about a vertical machine axis. The rotor includes storing units distributed around the machine axis. Each one forms a storage region extending extends along an axial direction thereof in the rotor's longitudinal direction to accommodate containers in a storage position. Each container is oriented with its axis in either square or radial to the machine axis. A transport system introduces containers into and causes them to issue from the storage regions. The transport system swivels a container into storage position upon introduction of the container from a normal container position in which its container axis extends in a vertical direction. It also swivels a container out of storage position and into the normal position as the container is issued from a storage region.

13 Claims, 5 Drawing Sheets

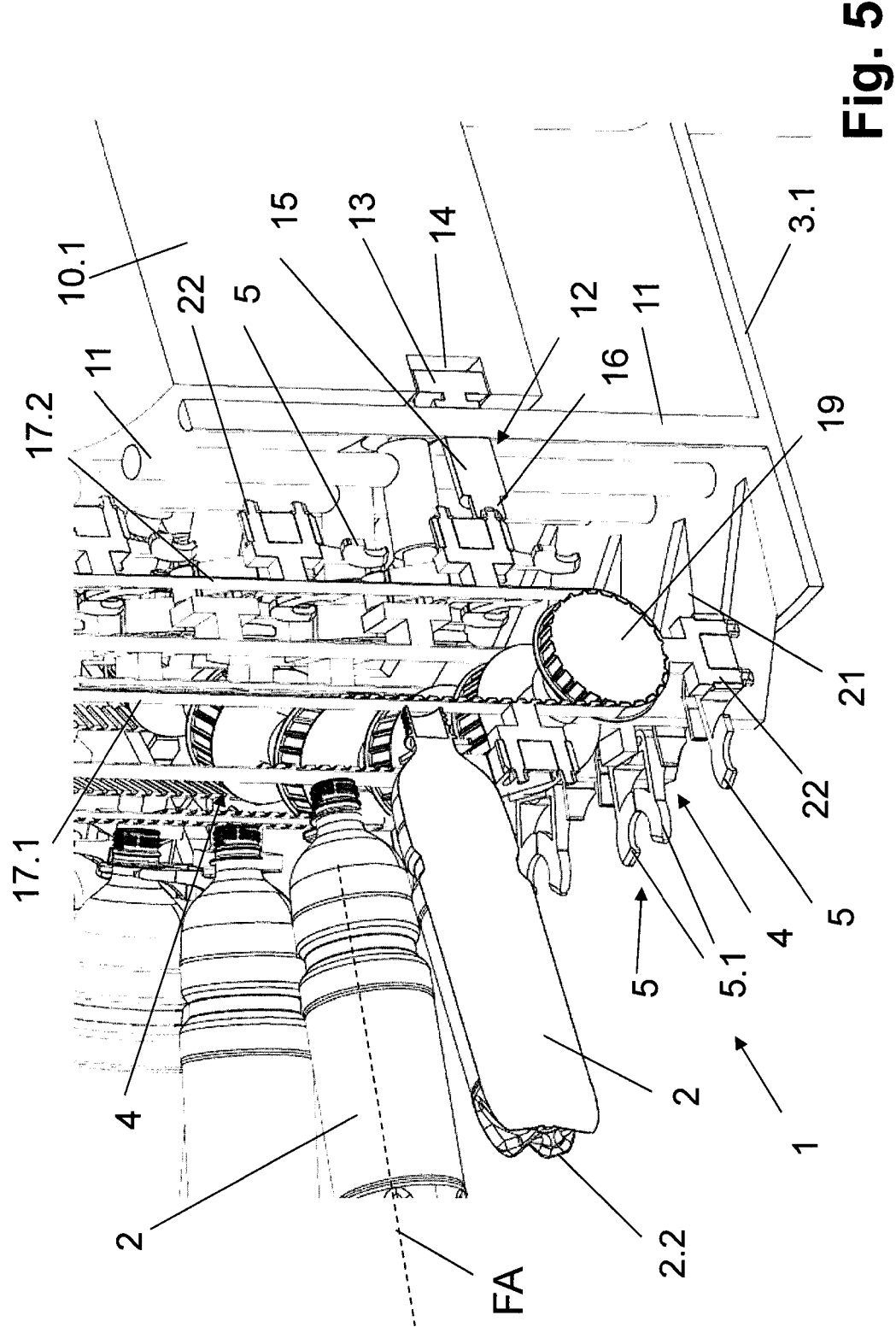

STORE, IN PARTICULAR BUFFER STORE FOR STORING BOTTLES OR SIMILAR CONTAINERS

CROSS REFERENCE TO RELATED APPLICATION

This application is the national phase under 35 USC 371 of international application no. PCT/EP2011/001695, filed Apr. 6, 2011, which claims the benefit of the priority date of German application no. 10 2010 023 757.4, filed Jun. 15, 2010. The contents of the aforementioned applications are incorporated herein in their entirety.

FIELD OF DISCLOSURE

The invention relates to a store for storing containers.

BACKGROUND

In container treatment plants, in particular also in plants of the beverages industry used for filling containers with a liquid filling material, for example with drink, it is frequently necessary to provide buffer stores in which containers which are not needed are buffered for example in the event of plant breakdowns. Such buffer stores are required in particular in the kind of plant which exhibits upstream of a filling machine a machine for producing the containers, for example a blower machine for producing the plastic (PET) containers from preforms by blow forming. In the event of breakdowns in the filling machine or in a machine downstream of the filling machine in the plant, it is necessary to buffer the containers (e.g. PET bottles) still being produced by the blower machine in a buffer store to prevent the discarding of surplus containers and in particular also of already preheated preforms.

A disadvantage of known buffer stores is their relatively large space requirement and installation space for sufficient storage capacity (maximum number of containers to be stored). In particular, known buffer stores are also unsuitable for integrated machine parts or plant parts, i.e. for plant parts which exhibit a plurality of machines, for example the blower machine, the filling machine, a sealing machine and a labelling machine, in a tight design and with no additional conveyor belts interconnecting the said machines.

A buffer store for storing bottles (U.S. Pat. No. 5,304,027) is known which consists essentially of a rotor that can be driven to rotate about a horizontal machine axis and on whose periphery is formed a plurality of storing units each extending in the rotor's longitudinal direction and specifically parallel to the machine axis and each having a storing region for receiving a plurality of bottles. The latter are oriented with their bottle axis radially to the machine axis in the respective storage region. The bottles can be moved by conveyor air from a charging position into the storing region of the respective storing unit, along the storing region as well as out of the storing region to a discharge position for discharging out of the store. This known buffer store too has at least the disadvantage of a relatively large space requirement.

SUMMARY

The object of the invention is to disclose a buffer store which is characterised by a small space requirement and compact design while being simplified in layout. A buffer store as described herein is configured to resolve this task.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

For the purpose of the invention the expression "essentially" means variations from the respective exact value by +/−10%, preferably by +/−5%.

The invention is explained in detail below through the use of an embodiment example with reference to the figures.

BRIEF DESCRIPTION OF THE FIGURES

FIG. 5 shows in enlarged perspective partial view the rotor, together with the storing units provided around the periphery of the rotor.

DETAILED DESCRIPTION

Figure 1:
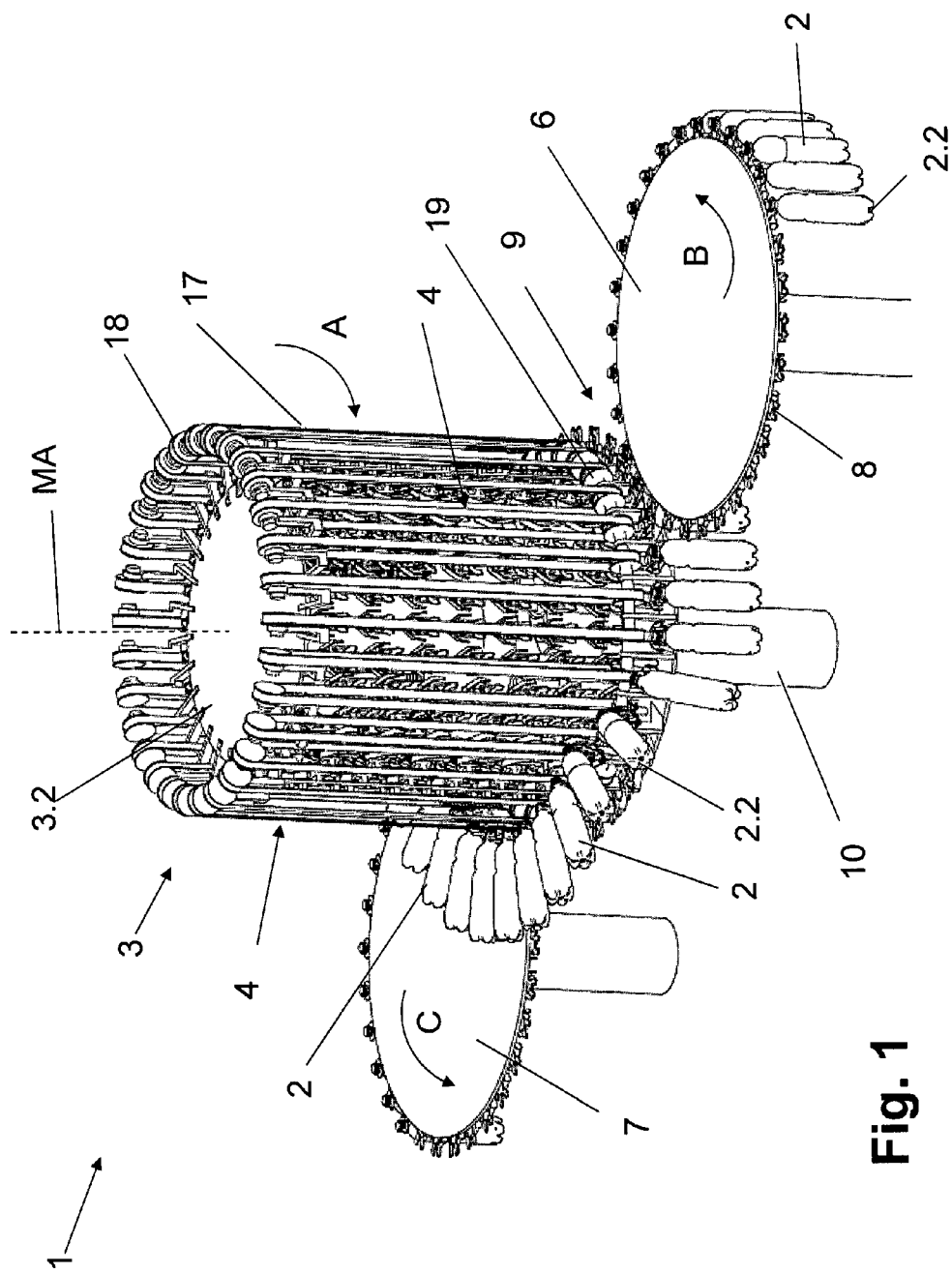
FIG. 1 shows in schematic perspective view an inventive buffer store for containers in the form of bottles.

The buffer store generally indicated in the figures by 1 serves for storing or buffering a plurality of containers in the form of bottles 2 which are depicted in the figures as PET bottles, and specifically in a plurality of levels that are arranged vertically above one another within a tight space.

To this end, buffer store 1 comprises a rotor 3 that can be driven to rotate about a vertical machine axis MA and on whose periphery there are formed, distributed at even angular distances about machine axis MA, a plurality of storing units 4 which in turn each exhibit a plurality of receptacles or holders in the form of bottle or container grippers 5 with which bottles 2 stored in buffer store 1 are held in storing regions in a plurality of annular levels arranged vertically above one another and with their bottle axis FA oriented radially to machine axis MA, in the manner described more fully below.

With rotor 3/storing units 4 are associated two bottle transport star wheels 6 and 7 each of which can be driven about a vertical axis synchronously with rotor 3 but counter to direction of rotation A of rotor 3, as indicated by arrows B and C for transport star wheels 6 and 7 respectively. About their periphery, transport star wheels 6 and 7 each exhibit a plurality of bottle receptacles in the form of bottle or container grippers 8, specifically at an angular distance or pitch which corresponds to the pitch of storing units 4 on rotor 3 and such that in the manner described more fully below, through the synchronising of the drives, whenever a container gripper 8 is present at container transfer position 9 between transport star wheel 6 and rotor 3, a container gripper 5 of a storing unit 4 is also present there in its pickup and dispensing position on a lower exit level. The same applies by analogy to the container transfer position between rotor 3 and transport star wheel 7.

In the case of the depicted embodiment, rotor 3 consists in essence of a lower ring-like rotor element 3.1 which encloses a machine element 10 arranged on the same axis as machine axis MA and not rotating with rotor 3, as well as an upper disc-like rotor element 3.2. The two rotor elements 3.1 and 3.2 whose surface sides are oriented at right angles to machine axis MA are interconnected by a plurality of internal guide bars 11 oriented with their longitudinal extension parallel to machine axis MA to form a cage-like structure of rotor 3. Rotor 3 is mounted by bearings (not shown) on machine part 10 which is depicted column-like only very schematically in the figures.

Figure 2:
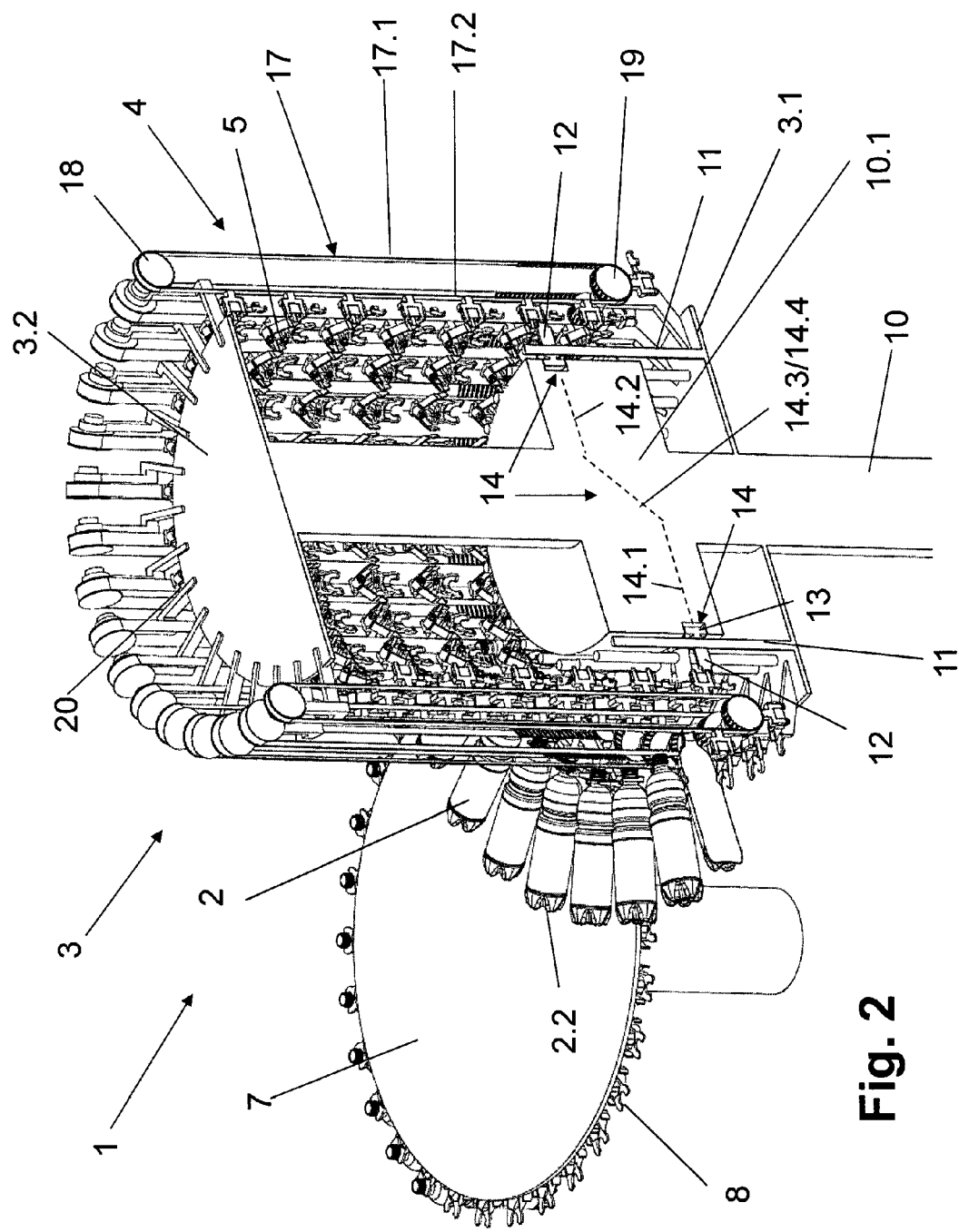
FIG. 2 shows in perspective view a section through the rotor of the buffer store in FIG. 1.
Figure 3:
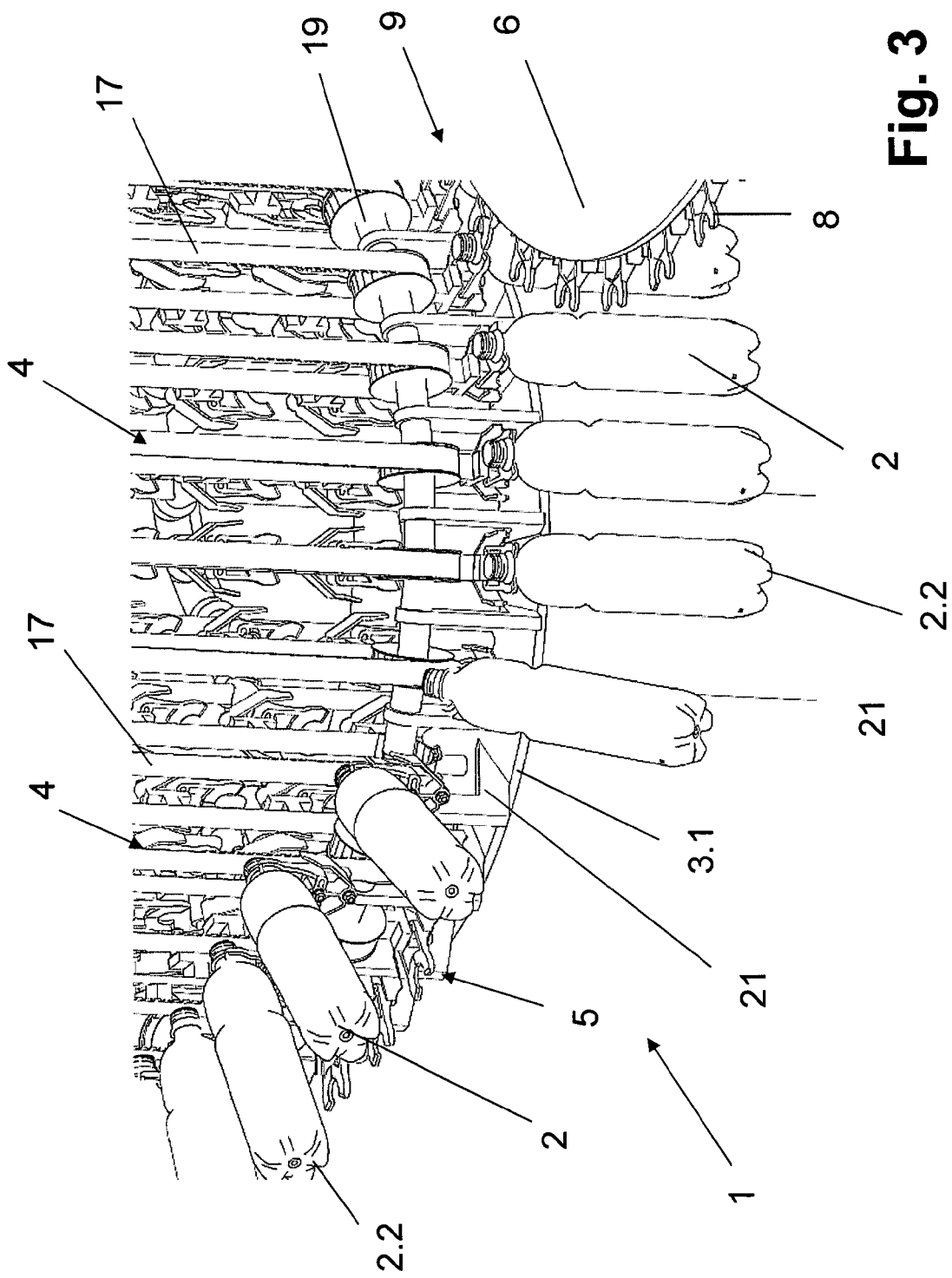
FIGS. 3 and 4 show in enlarged perspective partial view the transfer region between the rotor or storing units there located, and a transport star wheel.

With each storing unit 4 is associated, in the case of the depicted embodiment, a guide rod 11 on which in the case of the depicted embodiment a controllable driver 12 is guided in the guide rod's longitudinal direction, driver 12 being provided on its end that projects radially inward from respective guide rod 11 relative to machine axis MA with a cam roller 13 which engages freely rotatably about an axis radial to machine axis MA in a cam 14. The latter is configured on a section 10.1 of machine part 10 that is not moved with rotor 5, and in such a way that self-contained cam 14 exhibits two horizontal, i.e. each running in planes perpendicular to machine axis MA, circular-arc-shaped sections 14.1 and 14.2 on different height levels and two sections 14.3 and 14.4 which interconnect respectively sections 14.1 and 14.2 at an angle, i.e. helically, as indicated by the broken line in FIG. 2.

In the case of the depicted embodiment, each driver 12 associated with one storing unit 4 consists of a pneumatically operable detent cylinder whose cylinder housing 15 is guided in the manner of a carriage on the associated guide rod 11 and which in the activated condition interacts by its piston 16 with the associated storing unit 4 in the manner described below. Each storing unit 4 comprises a belt 17 which forms a closed loop and which in the case of the depicted embodiment is configured as a toothed belt and is guided over both an upper pulley 18 and a lower pulley 19 in such a way that each belt 17 forms a loop. The loop sections or belt lengths 17.1 and 17.2 running between pulleys 18 and 19 are oriented vertically, i.e. parallel to machine axis MA. In the case of the depicted embodiment the loop of each storing unit 4, which (loop) is formed by belts 17, is also arranged in a plane common with the guide rod 11 that is associated with that storing unit, said plane being oriented radially or essentially radially to machine axis MA, but said loop being arranged in such a way that relative to machine axis MA the loop formed by belt 17 is radially spaced apart from associated guide rod 11 and offset radially outwards relative to guide rod 11. Pulleys 18 and 19 are each mounted rotatably about axes tangential to a notional circular line concentrically enclosing machine axis MA, specifically in the case of the depicted embodiment in such a way that the axes of all pulleys 18 and 19 exhibit the same radial distance from machine axis MA.

For mounting upper pulleys 18 there are provided on the periphery of the circular-disc-shaped rotor element 3.2 support arms 20 which project beyond the periphery and beyond the top of rotor element 3.2 and on whose upper free end the bearing is configured for the associated pulley 18.

Lower pulleys 18 are each mounted between two platen-like bearing elements 21 provided on the top of annular rotor part 3.1.

Figure 4:
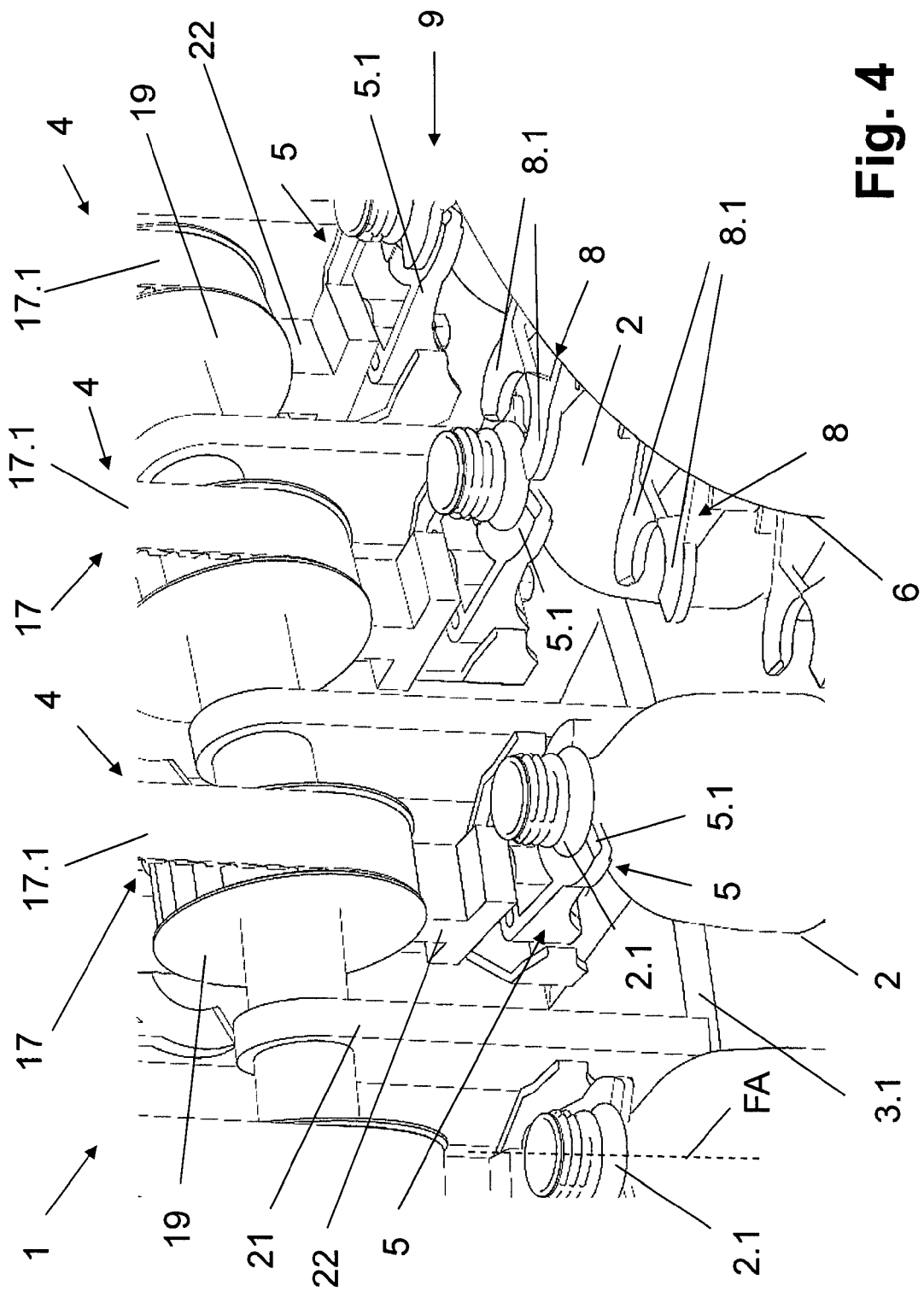

In the case of the depicted embodiment, container grippers 5 and 8 exhibit the configuration known to the skilled person of container or bottle grippers, each comprising two gripper-tong-like gripper elements 5.1 (container gripper 5) and 8.1 (container gripper 8) which, preloaded pivotably relative to one another by spring means in a gripping state, hold respective bottle 2 by its bottle neck forming the bottle mouth, preferably under a neck ring 2.1 which is there provided and which is usual especially in the case of PET bottles, as is shown particularly distinctly in FIG. 4.

On each belt 17, a plurality of holding elements 22 are fixed at equal intervals on a partial length and lying on the outside relative to the loop; said holding elements 22 project away from belt 17 concerned in an axial direction that lies in the loop plane of this belt and they each exhibit at their free end facing away from belt 17 a container gripper 5.

The number of holding elements 22 with container grippers 5 provided on each belt 17 is selected so that in an extreme state of each storing unit 4, all container grippers 5 are disposed on belt length 17.2 extending between pulleys 18 and 19 and lying radially inside relative to machine axis MA, and specifically with the exception of one container gripper 5 that is arranged in the pickup and dispensing position and which in that position beneath the lower deflection region or return point of belt 17 projects radially relative to machine axis MA out beyond the periphery of rotor 3 and in particular also of rotor part 3.1 for the pickup or dispensing of a bottle 2. In a second extreme state of storing unit 4, all container grippers 5 are located on belt length 17.1 which lies radially on the outside relative to machine axis MA, and again specifically with the exception of one container gripper 5 which has adopted the pickup and dispensing position and projects radially out beyond rotor 3 relative to machine axis MA. It goes without saying that by appropriate movement of respective belt 17, other states can be adopted between these extremes, in each state however with a container gripper 5 being present at the pickup and dispensing position whose height level also corresponds to the level of transfer position 9.

In the case of the depicted embodiment, container grippers 5 each project away from their holding elements 22 in one and the same peripheral direction of the loop formed by belt 17, i.e. in such a way that container grippers 5 project downwards away from associated holding element 22 on the radially inside belt length parallel to that belt length 17.2 and on the radially outside belt length 17.1 relative to machine axis MA are again oriented parallel to that belt length but projecting upwards away from associated holding element 22.

Buffer store 1 may assume different operating modes:
Storing of Bottles 2 in Buffer Store 1

For introducing and/or storing bottles 2 in buffer store 1 or in storing units 4, as rotor 3 and transport star wheels 6 and 7 rotate, bottles 2 initially held suspended by their bottle neck from container grippers 8 of for example the transport star wheel and with their bottle axes FA vertically oriented are successively transferred at container transfer 9 to a container gripper 5—located at the lowest position—of a storing unit 4 at which particular bottle 2 is then raised by a controlled moving of associated belt 17 into the storing region to a first storing level on which bottles 2 are arranged with their bottle axes FA oriented horizontally or radially to machine axis MA and with base 2.2 lying outward, a container gripper 5 now being again in position at each storing unit 4 for picking up a further bottle 2 at the pickup and dispensing position on the exit level.

The controlled moving of respective belt 17 and hence the controlled raising of respective bottle 2 to the storing level is effected by activation of associated driver 12 which when in the activated state is in working engagement with the radially inward belt length 17.2 of the storing unit 4 concerned or with a local holding element 22 and which, following falling section 14.3 of cam 14, draws the radially inward belt length 17.2 downwards, thereby effecting an upward movement of radially outward belt length 17.1 with container grippers 5 thereon by a storage stroke that is equal to the axial pitch of cam sections 14.1 and 14.2. The possibility therefore exists that with each complete revolution of rotor 3, a bottle 2 is picked up from each storing unit 4 at the pickup and dispensing position and then moved upwards by the storage stroke so that ultimately a plurality bottles with their bottle axes FA oriented radially to machine axis MA are received in a plurality of storage levels arranged vertically one above the other in buffer store 1.

In the case of the depicted embodiment, as well as the exit level buffer store 1 also exhibits seven storing planes each with a different storing level. In order to achieve the greatest possible storage capacity for buffer store 1 and its storing regions with the smallest possible overall height and/or shortest possible centres between pulleys 18 and 19 of storing units 4, container grippers 5 are provided in closest possible succession on belt 17, with however the centres of container grippers 5 being at any rate somewhat greater than the diameter of bottles 2.

Retrieving Bottles 2 From Buffer Store 1

The retrieving of bottles 2 from buffer store 1 is effected in reverse manner, starting with bottles 2 on the lowest storage plane of the storage regions such that by appropriate triggering of belts 17 of storing units 4, container grippers 5 of this lowest storage plane are lowered, together with bottles 2 which they are holding, to the pickup and dispensing position, for example before container transfer 9 is reached and by appropriate activating of drivers 12 which, following the rising section 14.4 of cam 14, move the respectively inner belt length 17.2 upwards and so move container grippers 5 provided on outer belt length 17.1 back by the storage stroke to the pickup and dispensing position or to the exit level on which bottles 2 are then forwarded in normal position, i.e. with their bottle axis FA vertically oriented, for example to transport star wheel 6 at container transfer 9 or to transport star wheel 7 at the container transfer which corresponds to container transfer 9.

Continuous Mode

If a storing of bottles 2 in buffer store 1 is not required, then bottle 2 can be fed, for example by way of transport star wheel 6, at container transfer 9 individually to a container gripper 5 of storing units 4 which (container gripper) is present in the pickup and dispensing position on the exit level, and forwarded to transport star wheel 7 with container grippers 5 remaining on the exit level and with rotor 3 rotating.

Drivers 12 or their detent cylinders can be controlled for example so that drivers 12 are always activated in the horizontal section 14.1 and 14.2 of cam 14, but in sections 14.3 and 14.4 of cam 14 only when bottles 2 are introduced into the respective storing region or for dispensing bottles 2 from the storage region.

In this operating mode (continuous mode) container grippers 5 which are arranged in the pickup and dispensing position or on the exit level and thus at the lower return point of belt 17 therefore facilitate an uninterrupted transport of bottles 2 from transport star wheel 6 to transport star wheel 7, i.e. from a container take-up to a container issue.

In the case of the depicted embodiment, belts 17 form a transport system in which, during storing, fed bottles 2 are raised up from the pickup and dispensing position or from the exit level there located to the first storing level of the respective storage region, or when bottles 2 are issued from buffer store 1, bottles 2 which are located on the first storing level are lowered down to the pickup and dispensing position or to the exit level, in both cases as bottles 2 are turned through 90° on an axis tangential to the direction of rotation A of rotor 3. Through its simplified design execution, buffer store 1 facilitates a storing of a plurality of bottles 2 or other containers that requires a small built volume or space and that can be used for a wide diversity of installations in which a buffering of bottles 2 or other containers is necessary or expedient. In particular but not exclusively, buffer store 1 is suitable as a plant component between a blower machine for producing bottles 2 from preforms by blow forming and a filling machine for filling bottles 2 with a liquid filling material, so that in the event of a breakdown of the filling machine or a subsequent machine (e.g. sealing machine or labelling machine), bottles 2 still being produced by the blower machine can be buffered in buffer store 1 at least until the breakdown is cleared and so there is no need to discard these bottles or preheated preforms as unusable.

The compact design also makes the buffer store 1 suitable in particular for integrated plants or machines, i.e. for machines which for the optimal utilisation of an available space are closely interconnected or combined to form a machine group or plant part and between which no additional transport elements or conveyor belts are required, for example to form an integral machine or plant group comprising blower machine, filling machine, sealing machine and labelling machine.

The fact that the container grippers 5 of each storing unit 4 which are not required or not occupied with bottles 2 are located on the belt lengths 17.2 which lie radially on the inside contributes to the compact design.

The invention has been described hereinbefore by reference to one embodiment. It goes without saying that numerous variations as well as modifications are possible without departing from the inventive concept underlying the invention.

REFERENCE LIST

1 Buffer store
2 Bottle
2.1 Mouth flange
2.2 Bottle base
3 Rotor
3.1, 3.2 Rotor element
4 Storing unit
5 Container gripper
5.1 Gripper element
6,7 Transport star wheel
8 Container gripper
8.1 Gripper element
9 Container transfer
10 Machine part
10.1 Section of machine part 10
11 Guide rod
12 Controlled driver
13 Cam roller
14 Cam
14.1-14.4 Cam section
15 Cylinder housing
16 Piston
17 Belt
17.1, 17.2 Belt length
18, 19 Pulley
20 Support arm
21 Bearing element
22 Holding element
A, B,C Direction of rotation of rotor 3 and of transport star wheels 6 and 7
FA Bottle axis
MA Vertical machine axis

The invention claimed is:

1. An apparatus comprising a buffer store for storing containers having a container axis, said buffer store comprising a rotor that can be driven to rotate about a vertical machine axis, said rotor comprising a plurality of storing units distributed around said machine axis, each of said storing units forming a storage region that extends along an axial direction thereof in a longitudinal direction of said rotor to accommodate a plurality of containers in a storage position, wherein each container is oriented with a container axis thereof in a direction selected from a group consisting of square to said machine axis and radial to said machine axis, and a transport system for introducing said containers into said storage regions and causing said containers to issue from said storage regions, wherein said transport system is configured to swivel a container into said storage position upon introduction of said container into a storage region from a normal container position in which a container axis thereof extends in a vertical direction, and wherein said transport system is configured to swivel a container out of said storage position and into said normal position as said container is issued from a storage region.

2. An apparatus comprising a buffer store for storing containers having a container axis, said buffer store comprising a rotor that can be driven to rotate about a vertical machine axis, said rotor comprising a plurality of storing units distributed around said machine axis, each of said storing units forming a storage region that extends along an axial direction thereof in said rotor's longitudinal direction to accommodate a plurality of containers in a storage position, wherein each container is oriented with a container axis thereof in a direction selected from a group consisting of square to said machine axis and radial to said machine axis, and a transport system for introducing said containers into said storage regions and causing said containers to issue from said storage regions, wherein said transport system comprises a plurality of transport elements of which at least one transport element is associated with each storing unit, each of said transport elements comprising container grippers, wherein each of said container grippers forms a storage location for one container, and each of said containers is incrementally movable with said associated transport element in an axial direction of a respective storage region.

3. The apparatus of claim 1, wherein said transport system comprises a plurality of transport elements, each of which is associated with a storing unit, wherein each of said transport elements comprises a container gripper, each of which forms a storage location for one container, said gripper being incrementally movable with a transport element associated with said gripper along an axial direction of said storage region.

4. The apparatus of claim 1, wherein said machine axis is a vertical axis, and said transport system is configured to swivel a container into storage position as said container is introduced into storage region, from a normal container region in which said container axis is vertical, and wherein said transport system is further configured to swivel a container out of storage position as said container is issued from said storage region.

5. The apparatus of claim 2, further comprising a drive for said transport elements, said drive being configured such that at the end of an incremental movement, a container gripper is present at one of a pickup position and a dispensing position of a storing unit to receive a container to be stored in said storing unit or to issue a container from said storing unit.

6. The apparatus of claim 1, wherein at least one of said storing units and storage regions thereof is configured for an array of stored containers with a container base lying radially on an outside relative to said machine axis.

7. The apparatus of claim 1, wherein said transport element comprises one of a band-like transport element, a chain-like transport element, and a belt-like transport element that extends by at least one length in an axial direction of a storing unit, said apparatus further comprising holders following one another at least over a partial length of said transport element along a longitudinal direction of said transport element.

8. The apparatus of claim 7, wherein said transport element forms a continuous loop between at least two deflection structures selected from the group consisting of deflection regions, deflection elements, and deflection pulleys located thereon, said continuous loop having a loop plane radially oriented relative to said machine axis, at least one transport element length, and a loop length corresponding to said transport element length and extending in an axial direction of said storage region, said apparatus further comprising holders that are movable with said transport element on said loop length.

9. The apparatus of claim 8, wherein said holders are arranged on said transport element such that at least one deflection region is oriented for gripping and releasing a container in a normal position thereof and for holding said container in a storage position thereof in said storage region.

10. The apparatus of claim 2, further comprising driving means for one of said transport system and said transport elements, said driving means being controllable between a first operating mode, in which movement of one of said transport system and said transport elements does not take place, a second operating mode in which said one of said transport system and said transport elements is moved for introduction of a container into said storage region of said storing unit, and a third operating mode in which said one of said transport system and said transport elements is moved for issuing a container from said storage region of said storing unit.

11. The apparatus of claim 10, wherein said driving means comprises a controllable driver that interacts with at least one cam not rotating with said rotor, said controllable driver being controllable to transition between an activated state, in which, for said a mode selected from said second operating mode and said third operating mode, said drivers are drivingly connected to one of said transport system and said transport elements for moving said one of said transport system and transport elements according to a path of said at least one cam, and a deactivated state, in which, for said first operating mode, no driving connection exists between said drivers and said one of said transport system and said transport elements, wherein said at least one cam comprises at least two circular-arc-shaped cam sections axially offset from one another relative to said machine axis, said at least two circular-arc-shaped cam sections comprising an axis of curvature coincident with said machine axis, and two helically curve sections that interconnect said at least two circular-arc-shaped cam sections, said two helically curved sections having an axis coincident with said machine axis.

12. The apparatus of claim 1, further comprising a transport star wheel for at least one of feeding containers to said storing units and issuing containers out of said storing units.

13. The apparatus of claim 12, further comprising two outer transporters disposed such that said rotor is between said two outer transporters, wherein said two outer transporters and said rotor define a transport path for containers that facilitates uninterrupted transport of said containers without storage of said containers in said storing unit.

* * * * *